(12) United States Patent
Gaucher et al.

(10) Patent No.: US 9,389,630 B2
(45) Date of Patent: Jul. 12, 2016

(54) PREDICTIVE SMART GRID RE-STRUCTURING BASED ON EXPECTED LOAD AND POWER GENERATION

(71) Applicant: International Business Machines Corporation, Armonk, NY (US)

(72) Inventors: Brian P. Gaucher, New Milford, CT (US); Jayant R Kalagnanam, Tarrytown, NY (US); Maharaj Mukherjee, Poughkeepsie, NY (US); Lloyd A. Treinish, Cortlandt Mannor, NY (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 14/186,361

(22) Filed: Feb. 21, 2014

(65) Prior Publication Data
US 2015/0241892 A1    Aug. 27, 2015

(51) Int. Cl.
*G05D 3/12*    (2006.01)
*G05F 1/66*    (2006.01)
*G05B 13/02*    (2006.01)
(Continued)

(52) U.S. Cl.
CPC ............. *G05F 1/66* (2013.01); *G05B 13/026* (2013.01); *G05F 1/67* (2013.01); *G06Q 50/06* (2013.01)

(58) Field of Classification Search
None
See application file for complete search history.

(56) References Cited

U.S. PATENT DOCUMENTS

| | | | | |
|---|---|---|---|---|
| 5,521,910 A | * | 5/1996 | Matthews | ............ H04L 12/5602 370/256 |
| 5,732,192 A | * | 3/1998 | Malin | ................. G06F 17/5053 703/2 |

(Continued)

OTHER PUBLICATIONS

Chakrabortty et al. "Introduction to Wide-Area Control of Power Systems", Jun. 2013, American control Conference 2013, pp. 6758-6770.*

(Continued)

*Primary Examiner* — Jason Mitchell
(74) *Attorney, Agent, or Firm* — Harrington & Smith

(57) ABSTRACT

A method for structuring an electric utility grid having traditional and renewable sources of electric power uses a weather forecasting system to determine, for a time interval, whether there are paths between all generating units and all consuming units satisfying certain constraints. The method includes computing a probable output for each of the generating units, both traditional and renewable, and computing a probable load for each of said consuming units for the time interval using both historical and weather forecast data. The method also includes determining the maximum load capacity of each segment in the utility grid for the time interval, the segments being the power lines making up the grid, and assigning the maximum load capacity of each segment to be a constraint therefor for the time interval and computing whether there are paths from each of the generating units to each of the consuming units for which the maximum load capacities will not be exceeded. If such paths exist, the method further concludes with setting the utility grid to the paths; and transmitting electric power over the paths for the time interval. If such paths do not exist from each generating unit to each consuming unit, the method instead continues by reducing the maximum capacities of the generating units; and recomputing whether there are paths from each of the generating units to each of the consuming units as many times as is necessary to find paths satisfying the constraints, each time further reducing the maximum capacities of the generating units.

33 Claims, 7 Drawing Sheets

(51) Int. Cl.
*G05F 1/67* (2006.01)
*G06Q 50/06* (2012.01)

(56) References Cited

U.S. PATENT DOCUMENTS

| | | | |
|---|---|---|---|
| 7,221,315 B1 | 5/2007 | Chen et al. | |
| 7,246,007 B2 | 7/2007 | Ferman | |
| 7,260,472 B2 | 8/2007 | Sutardja | |
| 7,269,505 B2 | 9/2007 | Zhao et al. | |
| 7,292,937 B2 | 11/2007 | Kuroda et al. | |
| 7,319,931 B2 | 1/2008 | Uyeki et al. | |
| 7,519,506 B2* | 4/2009 | Trias | H02J 3/00 700/286 |
| 8,150,611 B2 | 4/2012 | Mukherjee | |
| 8,417,391 B1* | 4/2013 | Rombouts | G05B 13/02 700/286 |
| 2004/0032831 A1* | 2/2004 | Matthews | H04J 14/0227 370/238 |
| 2007/0191992 A1* | 8/2007 | Taliaferro | H02H 7/28 700/286 |
| 2008/0195255 A1* | 8/2008 | Lutze | F03D 7/0284 700/291 |
| 2009/0055030 A1* | 2/2009 | Mayor | F03D 7/0284 700/287 |
| 2010/0004790 A1* | 1/2010 | Harbin, III | F24D 19/1051 700/291 |
| 2010/0218108 A1* | 8/2010 | Crabtree | G06Q 50/06 715/738 |
| 2011/0307109 A1* | 12/2011 | Sri-Jayantha | G06Q 10/04 700/291 |
| 2012/0029716 A1* | 2/2012 | Sekoguchi | H02J 3/38 700/293 |
| 2012/0271470 A1* | 10/2012 | Flynn | H02J 3/383 700/292 |
| 2012/0277923 A1* | 11/2012 | Tsuchiya | B60L 11/1862 700/291 |
| 2013/0218360 A1* | 8/2013 | Najewicz | G05B 15/02 700/294 |
| 2014/0148962 A1* | 5/2014 | Venayagamoorthy | G05B 13/048 700/286 |
| 2014/0172182 A1* | 6/2014 | Subbotin | H02J 7/35 700/291 |
| 2014/0172329 A1* | 6/2014 | Zhang | G06Q 50/06 702/60 |
| 2014/0172503 A1* | 6/2014 | Hammerstrom | G06Q 30/0206 705/7.31 |
| 2014/0200723 A1* | 7/2014 | Roy | G06Q 50/06 700/291 |
| 2014/0336833 A1* | 11/2014 | Marinopoulos | G01W 1/10 700/291 |
| 2015/0012144 A1* | 1/2015 | Wang | H02J 3/00 700/291 |
| 2015/0012147 A1* | 1/2015 | Haghighat-Kashani | G06Q 30/02 700/291 |
| 2015/0051866 A1* | 2/2015 | Chu | G06Q 50/06 702/150 |
| 2015/0154504 A1* | 6/2015 | Zhang | G06N 7/005 706/52 |

OTHER PUBLICATIONS

Gupta et al. "Probabilistic Framework for Evaluation of Smart Grid Resiliance of Cascade Failure", May 2014, 2014 IEEE Innovative Smart Grid Technologies—Asia, pp. 255-260.*
Shirzeh et al. "Adaptive Stochastic Energy Flow Balancing in Smart Grid", May 2013, 2013 IEEE Energytech, pp. 1-6.*
Fan et al., "Probabilistic Power Flow Analysis With Generation Dispatch Including Photovoltaic Resources", May 2013, IEEE Transations on Power Systems, vol. 28, No. 2. pp. 1797-1805.*
Fang et al., "Online Strategizing Distributed Renewable Energy Resource Access in Islanded Microgrids", Dec. 2011, 2011 IEEE Global Telecommunications Conference, pp. 1-6.*
Qudaih, "Model Predictive Based Load Frequency Control Design in the Presence of DFIG Wind Turbine", Nov. 2011, 2011 2nd International Conference on Electric Power and Energy Conversion Systems, pp. 1-5.*

* cited by examiner

PREDICTIVE SMART GRID RE-STRUCTURING BASED ON EXPECTED LOAD AND POWER GENERATION

TECHNICAL FIELD

This disclosure relates to electric power generation and transmission, and, more particularly, to networked grids for transmitting electricity from producers to consumers.

BACKGROUND

Electric utility grids have traditionally been hierarchical and centralized, meaning that the energy flow is optimized for the transfer of electric energy from large generation stations downstream to consumers at the end of the line. In other words, the grid structure is designed to transport energy in one direction, namely, downstream from producers to consumers. Moreover, an electric utility infrastructure itself is optimized, or designed, at all points to tolerate a certain maximum load, while operating in this hierarchical manner.

The grid structure, in a simplified sense, may be compared to a tree, where the trunk transmits electric energy, for example, from a generating station, analogous to the roots of the tree, at high voltage through limbs and branches, which gradually divide and split to deliver the electric energy to consumers at lower voltages. In practice, unlike in an actual tree, a certain amount of branch redundancy is built into the grid, so that more than one transmission route may be available between a source, such as a generating station, and ultimate users, in case some branches become unavailable or are out of service for some reason.

In an electric utility grid, the trunk and branches are more commonly referred to as lines, which are linked to one another at nodes. Nodes allow switching functions between several connections, like network switches, but they must allow for arcs that might form during a switching operation to subside, and the grid to stabilize, before performing a subsequent switching operation. Each line and node is designed and optimized for power flow down the tree. Both lines and nodes have rated capacities, which are the maximum loads that each can carry. These ratings are not necessarily fixed, but can vary depending upon the age of the equipment and its physical condition, as well as upon such weather conditions as ice, wind, and temperature. The electric utility infrastructure, as a whole, is optimized to tolerate a certain maximum load at different nodes of the grid under the assumption of a hierarchic energy flow.

Electric utilities always need to balance supply and demand, as any mismatch between supply and demand may create an imbalance in the grid. Although there are a few technologies for storing relatively small amounts of electric energy, such as magnetic storage, dynamic storage, fluid storage, and batteries, there is as yet no technology for temporarily storing large amounts of electric energy to maintain the balance if supply exceeds demand. As a consequence, the supply being made available must match demand to a large extent. It will be appreciated that some amount of prediction is involved to anticipate the demand in coming hours and days, so that the proper supply may be generated and made available.

Traditionally, electricity has been produced at large generating stations from energy derived from the burning of coal or natural gas, nuclear fission, or hydroelectric sources. Historically less important contributions, from the viewpoint of percentages, have been derived from such renewable, or "green", sources as geothermal, wind, and solar energy sources. In recent years, consumers themselves, with the purchase of the appropriate equipment, have been able to produce their own electricity using wind and solar sources, and are able to send any unneeded excess out into the grid. As a consequence, with technologies that have recently become available, consumers of electricity can now become both producers and consumers, or "prosumers", of electricity, turning the traditional utility grid into a network having sources scattered throughout.

The prosumers, of course, provide the network with additional sources of electric energy. However, wind and solar sources are largely weather-dependent and are impacted by storms, as well as by variations due to local geography, season and climate. Wind power is clearly driven by the characteristics of the local winds, although turbine performance will be affected by temperature and precipitation, as well as by the three-dimensional variation in the wind speed and direction. Solar power clearly only applies during the daylight hours, but it will vary depending on cloud cover, temperature, precipitation, and wind, as well as on aerosol content, as indicated by atmospheric turbidity. Hence, these renewable sources introduce some uncertainty into the network because they are intermittent and variable. Most utility grids, designed with a hierarchical structure with a source at the top controlled by the producers, are not designed to operate with this uncertainty and intermittency. As a consequence, the grid may get overloaded if several prosumers start to send electricity out into the network at the same time. In turn, grid instability, with an increased stress level on the infrastructure, a lower quality of delivered power, and rolling blackouts, may result. The challenge, then, is to enable the right balance between traditional base generation and intermittent sources, while maintaining economic grid stability, and avoiding sudden over- or under-loading.

The present invention provides a way to address this uncertainty for grids having consumers who are also producers of electricity.

SUMMARY

According to the present invention, a method for a utility grid having a network of interconnecting segments of power lines connecting generating units to consuming units, each of said interconnecting segments having a maximum electric power capacity comprises computing a probable electric power output for each of a plurality of generating units for a given time interval, each of the plurality of generating units having a maximum electric power generating capacity. The plurality of generating units includes at least one generating unit whose electric power output depends on the weather. A respective confidence level associated with each of the plurality of generating units is also computed for the given time interval.

The method also comprises computing a probable electrical power load for each of a plurality of consuming units for the given time interval, each of the plurality of consuming units having a maximum allowed electric power load. A respective confidence level associated with each of the plurality of consuming units is also computed for the time interval.

The method further comprises determining whether there are paths having one or more segments of power lines from each of said generating units to each of said consuming units, wherein the paths satisfy the following constraints: a) the actual output of each of the generating units is less than or equal to the probable output thereof for the time interval; b) the actual load of each of the consuming units is less than or equal to the probable load thereof for the time interval; and c)

the actual load capacity for each of the segments is less than or equal to the maximum load capacity thereof for the time interval.

When there are paths satisfying the constraints, the method further comprises setting the utility grid to the paths; and transmitting electric power over the paths for the time interval. When there is no path between one of the generating units and one of the consuming units satisfying the constraints, the method instead comprises reducing the capacity of at least one of the generating units; and re-computing whether there are paths from each of the generating units to each of the consuming units as many times as is necessary to find paths satisfying the constraints, each time further reducing the capacity of at least one of the generating units.

According to another aspect of the present invention, an apparatus comprises one or more processors, and one or more memories including computer program code. The one or more memories and the computer program code are configured, with the one or more processors, to cause the apparatus to perform the method described above.

According to yet another aspect of the present invention, a computer program product comprises a computer-readable storage medium bearing computer program code embodied therein for use with a computer, the computer program code comprising code for performing the method described above.

DETAILED DESCRIPTION

The present invention addresses the problem of network overloading by predicting dynamically in almost real time the route in a networked grid where overloading ("hot spots") may occur while transmitting energy from a source, or sources (net producers of energy), to a sink, or sinks (net consumers of energy). The present invention does so by finding an alternate transmission path over the grid network to avoid overloading on any particular network point; and by creating a generation plan to avoid hot spots in the future, in order to make better use of renewable sources, to reduce the stress on the electric utility infrastructure, to reduce the cost of energy transmission and distribution to benefit consumers, and to prevent sudden stress that may result in a blackout.

Figure 1:
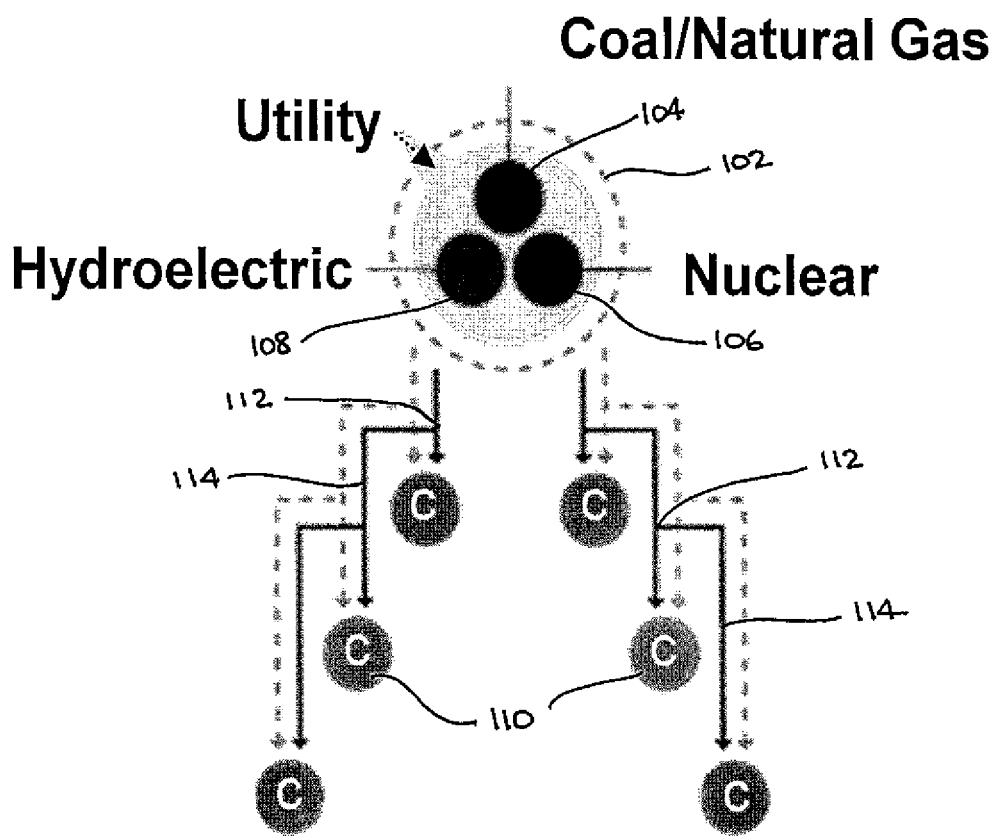
FIG. 1 is a diagram which schematically represents the traditional energy value chain.

Reference is now made to FIG. 1, which is a diagram which schematically represents the traditional energy value chain, with the generating utility at the top and the consumers downstream. The generating utility 102 is represented by the circle at the top of the diagram. Traditionally, power has been generated using nonrenewable fossil fuels 104 (coal and natural gas) and nuclear sources 106, and renewable hydroelectric sources 108. Energy flow has been traditionally downward from the top of the diagram to ultimate consumers ("C") 110 at the bottom in this hierarchical arrangement. Nodes 112 are points where lines 114 split or branch. Under this traditional scenario, the generating utility 102 provides the power needed at any given time to the consumers downstream with the supply being matched to the demand to keep the grid, represented by the lines 114 from the generating utility 102 to the consumers 110, in balance and to prevent overloading or hotspots.

Figure 2:
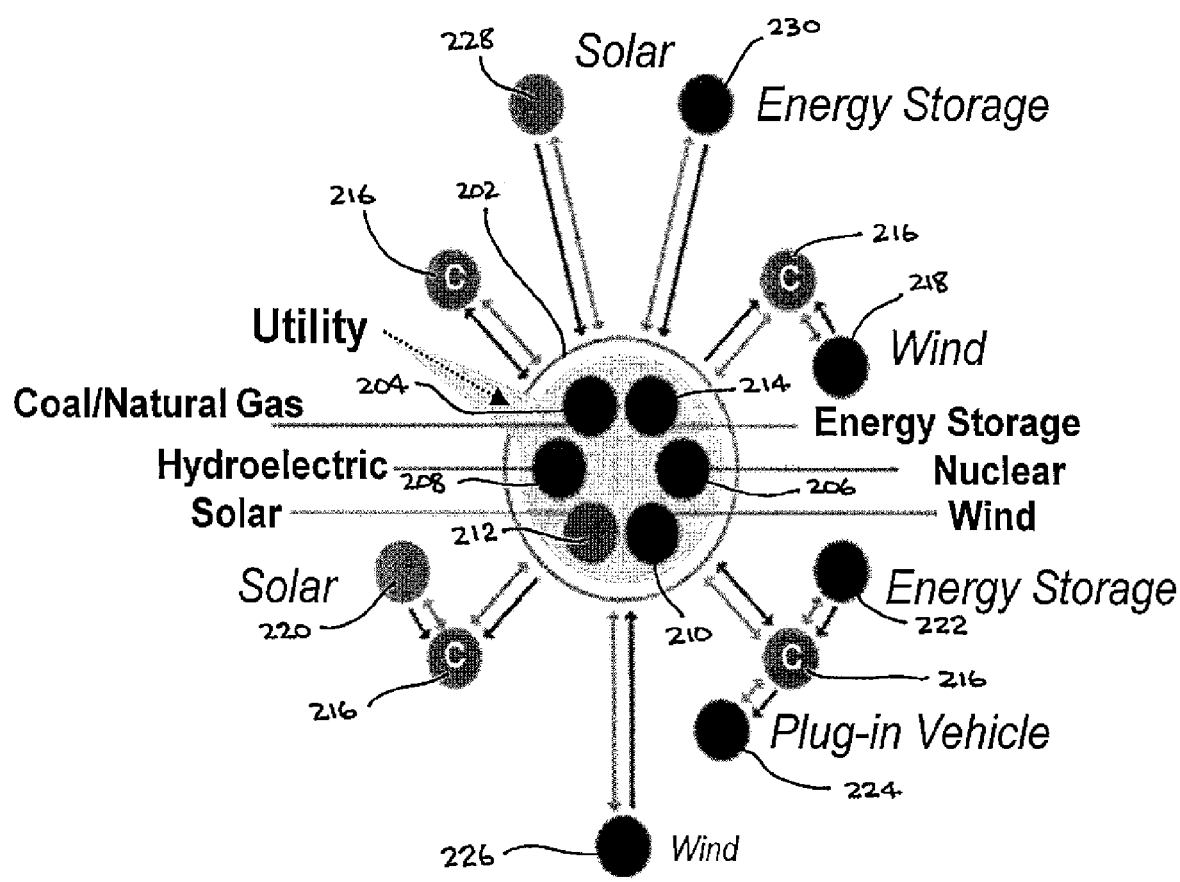
FIG. 2 is a diagram which schematically represents the modern, transformed energy value chain.

FIG. 2, on the other hand, is a diagram which schematically represents the transformed energy value chain which results when consumers become prosumers. Here, the generating utility 202 is again represented by a circle, but now it is at the center of the diagram. In addition to generating electric energy using nonrenewable fossil fuels 204 (coal/natural gas) and nuclear sources 206 and renewable hydroelectric sources 208, the generating utility 202 now may also exploit wind sources 210 and solar sources 212, as well as energy storage technologies 214. Arrayed radially outward from the center are consumers ("C") 216, who or which may also have equipment to generate electric energy from wind sources 218 and solar sources 220, as well as energy storage technologies 222, such as batteries. Note that it is also possible for a plug-in vehicle 224 to supply electric power to the grid. In addition, wind sources 226, solar sources 228 and energy storage technologies 230 not associated with a consumer, but with producers, who generate electric energy for sale to the utility, may also contribute to the energy being transported by the grid.

As a result of these developments, the electric utility grid is still largely hierarchical, but has additional sources scattered to some extent throughout. The challenge is to enable the right balance between traditional base generation and intermittent sources while maintaining economic grid stability.

At the outset, it should be understood that contemporary electric utility grids are "smart grids" in the sense that they are able to use information and communications technology to gather and act on information, such as information about the behaviors of suppliers and consumers, in an automated fashion to improve the efficiency, reliability, economics, and sustainability of the production and distribution of electricity.

For example, the smart grid makes use of technologies that improve fault detection and allow self-healing of the network without the intervention of technicians. In other words, where a problem is detected, circuits may be switched in the network automatically to redirect the flow of energy to avoid overloading a specific node or line. This ensures a more reliable supply of electricity and reduced vulnerability to natural disasters or attack.

The flexibility of the smart grid permits greater use of highly variable renewable energy sources, such as solar power and wind power. As discussed above, current network infrastructure was not built to allow for many distributed feed-in points, and typically, even if some feed-in is allowed at the local (distribution) level, the transmission-level infrastructure cannot accommodate it. Rapid fluctuations in distributed generation, such as due to cloudy or gusty weather, present significant challenges to power engineers who need to ensure stable power levels through varying the output of the more controllable generators. Smart grid technology is a necessary condition for very large amounts of renewable electricity on the grid for this reason.

Another necessary condition is highly localized and timely weather forecasts at the scale of the renewable energy generator, so that the amount of power that may be provided by renewable energy sources may be predicted for the short term. With such predictions, the amount of power to be provided to the network by both renewable and non-renewable sources may be adjusted so that the network may not become over- or under-loaded at any point. Such forecasts may be obtained using the weather forecasting service known as Deep Thunder, which is available from International Business Machines Corporation.

Figure 3A:
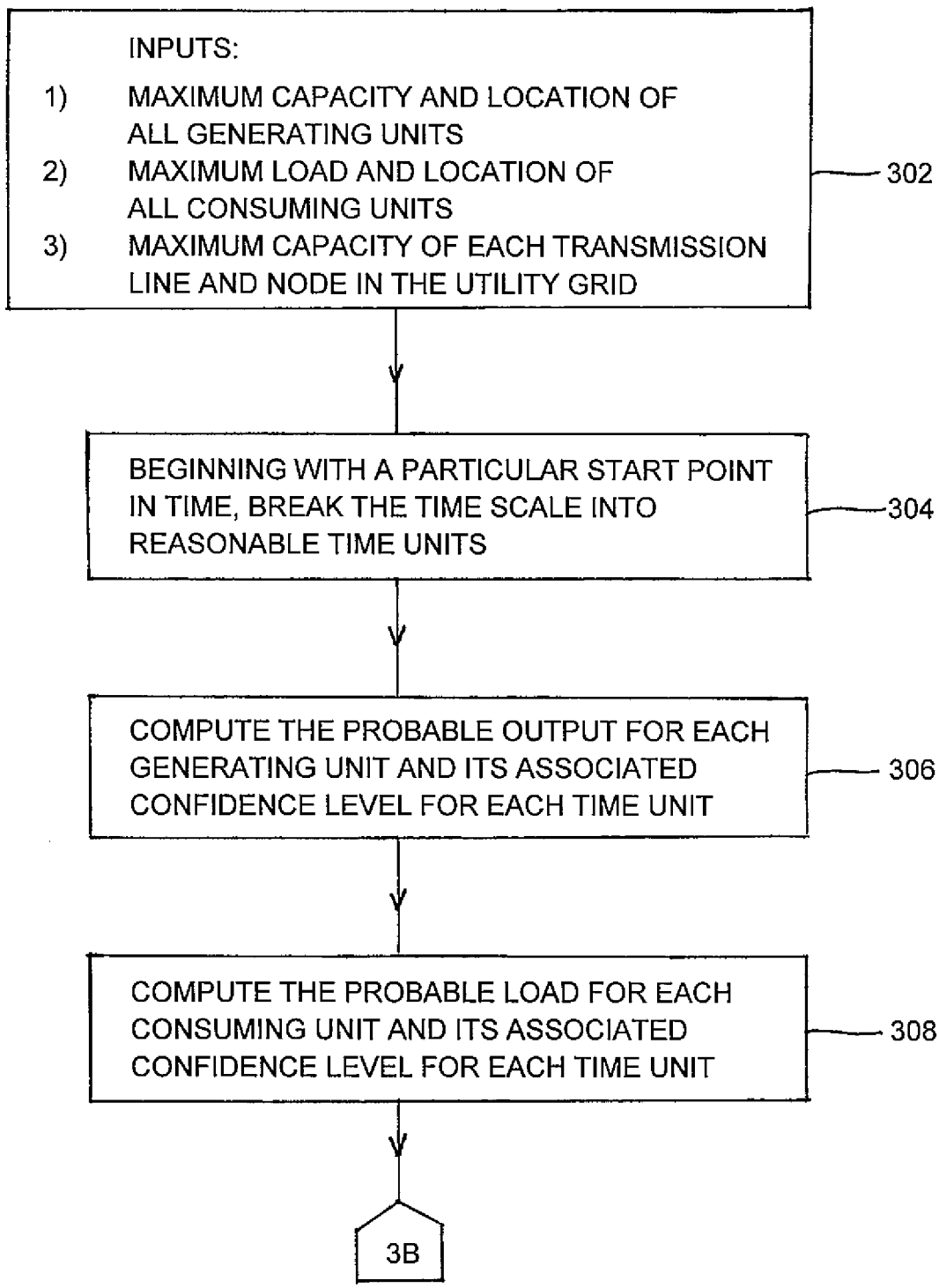
FIGS. 3A and 3B together are a flow chart illustrating a brief solution to the problem.
Figure 3B:
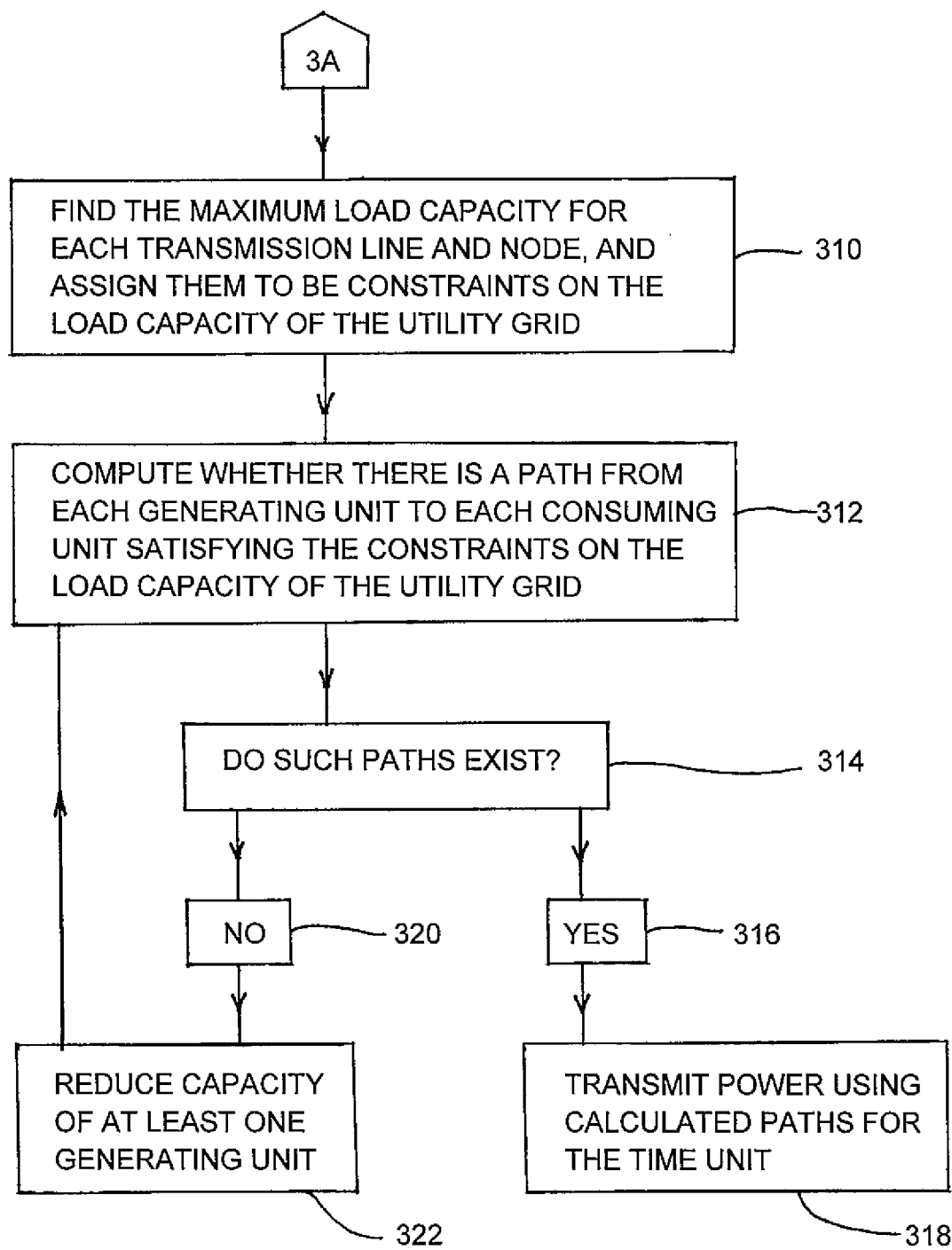

Essentially, the challenge to enable the right balance between traditional base generation and intermittent sources while maintaining economic grid stability may be met by using stochastic predictions to match the load and the demand at all points in the grid at all times. Reference is now made to FIGS. 3A and 3B, which together are a flow chart illustrating a brief solution to the problem.

A first step, as illustrated in block 302 in FIG. 3A, involves the use of stochastic forecasting and weather prediction at particular areas of the grid to predict possible energy output from all sources over the grid at any particular instant of time. For the sake of the present discussion, it will be assumed that the additional sources of electric energy on the grid will be wind and solar sources. As noted previously, the possible output of wind and solar sources is largely weather-dependent. The possible output of wind sources depends on the three-dimensional wind speed and direction of the wind at each turbine and on the proximity of each turbine to its neighbors to take wake effects into account. The possible output of solar sources, which clearly only applies during the daylight hours, is dependent upon the short-wave solar radiation flux at the location of each solar cell. Hence, the possible output of solar sources will vary depending on cloud cover, temperature, precipitation, and wind, as well as on aerosol content, as indicated by atmospheric turbidity. In short, to predict the power output of a wind or solar source at any particular time on the scale of a few hours to a few days into the future, one must apply a full, dynamic, three-dimensional physical model of the atmosphere at the scale of the generation facility to accurately predict and estimate the forecast uncertainty of the power output from sources of each type.

In addition, as illustrated in block 302, meeting this challenge involves the use of stochastic forecasting and weather prediction at particular areas of the grid to predict possible energy requirements at all sinks, that is, consumers, over the grid at any particular instant of time. Of course, these possible energy requirements will also depend on the time of day and weather conditions, and will vary depending on the exact nature of the consumer, that is, whether it is a business or residence. Electric utilities have long made such predictions to estimate the amount of power they will have to be prepared to generate at different times of day, times of the year, and in different seasons and weather conditions, although the accuracy of such predictions is generally low and the uncertainty high and poorly quantified. The response to the local dynamics is reactive, not predictive, and load pockets are poorly addressed.

Next, as further illustrated in block 302, it is also necessary to consider the maximum power handling capabilities of all the nodes and lines in the electric grid at any particular instant of time. As noted previously, both lines and nodes have rated capacities, which are the maximum loads that each can carry. These capacities may depend on the physical condition of the line at that time, as well as on the weather, because of such factors as thermal limitations, wind loading, and ice accumulation during the winter.

Therefore, the inputs required for a brief solution to the problem, as shown in block 302 of FIG. 3A, are:
1. The maximum capacity and location of all generating units, i, for i=1 to n, with n being the total number of generation units, including renewable sources such as solar and wind;
2. The maximum load requirement and location of all consuming units, j, for j=1 to m, with m being the total number of consuming units; and
3. The maximum capacity of each transmission line and node of the entire utility grid in every path connecting each generation unit to each consuming unit.

The solution is made with reference to a particular starting point in time (t=0). The next step, then, as indicated in block 304, is to break the time scale going forward from that starting point into the future into reasonable-length time units, k, for k=1 to q, with q being the number of time units into the future the solution will cover. The time units can be between between one-half hour and twelve hours, depending on the predictability and accuracy of these predictions. Between five and ten hours is probably the best place to operate.

The next step, as indicated in block 306 of FIG. 3A, is to compute the probable output for each generating unit and the associated confidence level for each time unit k as $g(i,k)=\{G(i,k), g\_conf(i,k)\}$ for i=1 to n and k=1 to q, and to associate the value of $g(i,k)$ with each generating unit i for i=1 to n, for each time k=1 to q. The probable output for traditional units can be determined with reference to their operating manuals. For non-traditional and renewable sources, such as wind and solar, the probable outputs are determined by a stochastic model based on the weather prediction. For wind turbines, this is done by first predicting the three-dimensional wind velocity and then using a stochastic model that uses historical data to determine how much power will be generated along with the confidence level for a certain time period. As stated, this can be fairly accurately done over a time period of a few hours to a day or so. For solar panels, this is done by first predicting the solar radiation flux in the spectral range where the solar panels are sensitive and then using a stochastic model that uses historical data to determine how much power will be generated along with the confidence level for a certain time period. As stated, this can be fairly accurately done over a time period of a few hours to a day or so.

In a similar manner, as indicated in block 308 of FIG. 3A, the probable load for each consuming unit and the associated confidence level are computed for each time unit k as $c(j,k)=\{C(j,k), c\_conf(j,k)\}$ for j=1 to m and k=1 to q, and the value of $c(j,k)$ is associated with each consuming unit j for j=1 to m, for each time k=1 to q. Utility companies have been doing this for years for their generating plan. They use a stochastic model based on historical data and current input, such as, cost of power, time of the day, season, day of the week, holidays, weather conditions, and so forth.

Referring to block 310 in FIG. 3B, for each segment (line or node) of the utility grid l, the next step is to find the maximum load capacity $X\_l$, for l=1 to p, with p being the total number of segments (lines or nodes), and to assign $X\_l$ to each segment l as the constraint on the load capacity for that segment. The maximum load capacity is the current, voltage, power, and surge limits set on all operating equipment and transmission and distribution lines by their operating manuals.

Next, as indicated in blocks 312, 314 of FIG. 3B, for each time unit k=1 to q, it is necessary to compute, using a greedy algorithm, such as Kruskal, Dijkstra or Single Source Shortest Path, whether there is a path from each generating unit, i, for i=1 to n, to each consuming unit, j, for j=1 to m, following the segments k, for k=1 to p, that satisfies the following constraints:
1. $g'(i,k) \leq \{G(i,k), g\_conf(i,k)\}$ for i=1 to n, where $g'(i,k)$ is the actual generation at generating unit i at time k;
2. $c'(j,k) \leq \{C(j,k), c\_conf(j,k)\}$ for j=1 to m, where $c'(j,k)$ is the actual consumption at consuming unit j at time k; and
3. for each segment l, $x'\_l \leq X\_l$ for l=1 to p.

Greedy algorithms are known by many different names. They are also known as algorithms for "steepest descent (or ascent)" or "hill climbing." The idea is always from any point to use the highest slope to find the next operating point until one cannot go up or down any further. These algorithms tend to find an optimal point very quickly. But the problem is they may not find a global optimum. They can get stuck at local optima. Such as in hill climb, it can go up a local peak and may not go up the tallest peak. But, for present purposes, it is suitable as long as it is very fast.

If such paths from each generating unit, i, to each consuming unit, j, are found (block 316), it is then only necessary to set the grid structure to those paths for that time unit k to transmit power (block 318). Otherwise (block 320), it will be necessary (block 322) to reduce the capacity of at least one of the generating units, i, and repeat the computations again as many times as is necessary to find whether there is a path that satisfies the constraints above.

In order to obtain a more detailed solution for the optimum transmission route, it will be necessary to account for the typical latencies in the stochastic forecasting connected with renewable energies. For both wind and solar energies, the typical latencies are from two hours to a day (24 hours). That is to say, predictions on the amounts of power that may be generated from wind and solar energy are typically anywhere between a few hours to a few days into the future, the exact amount, of course, depending on weather conditions. Different time scales require different approaches for the forecasting of weather for these purposes. The time scales and the methods are different for solar and wind. In general, the physical-based methods are best for a few hours in the future up to a few days. For an hour or so or less, analysis of measurements from sensors, that is, nowcasting, is best, but that requires that the appropriate instrumentation be in place. In between, hybrid methods would be required.

In addition, the typical latency in demand forecasting for a utility grid is on the order of a few hours, and, in general, is normally greater than the latency in the forecasting of renewable resources.

However, the typical latency for switching a single device in a utility grid is on the order of microseconds, and for switching all circuits in a utility grid is, in a worst case scenario for all devices within a grid, only a few minutes. In other words, when a detailed solution of an optimum transmission route is obtained, the circuits may be switched to re-structure the grid in a matter of minutes.

Figure 4A:
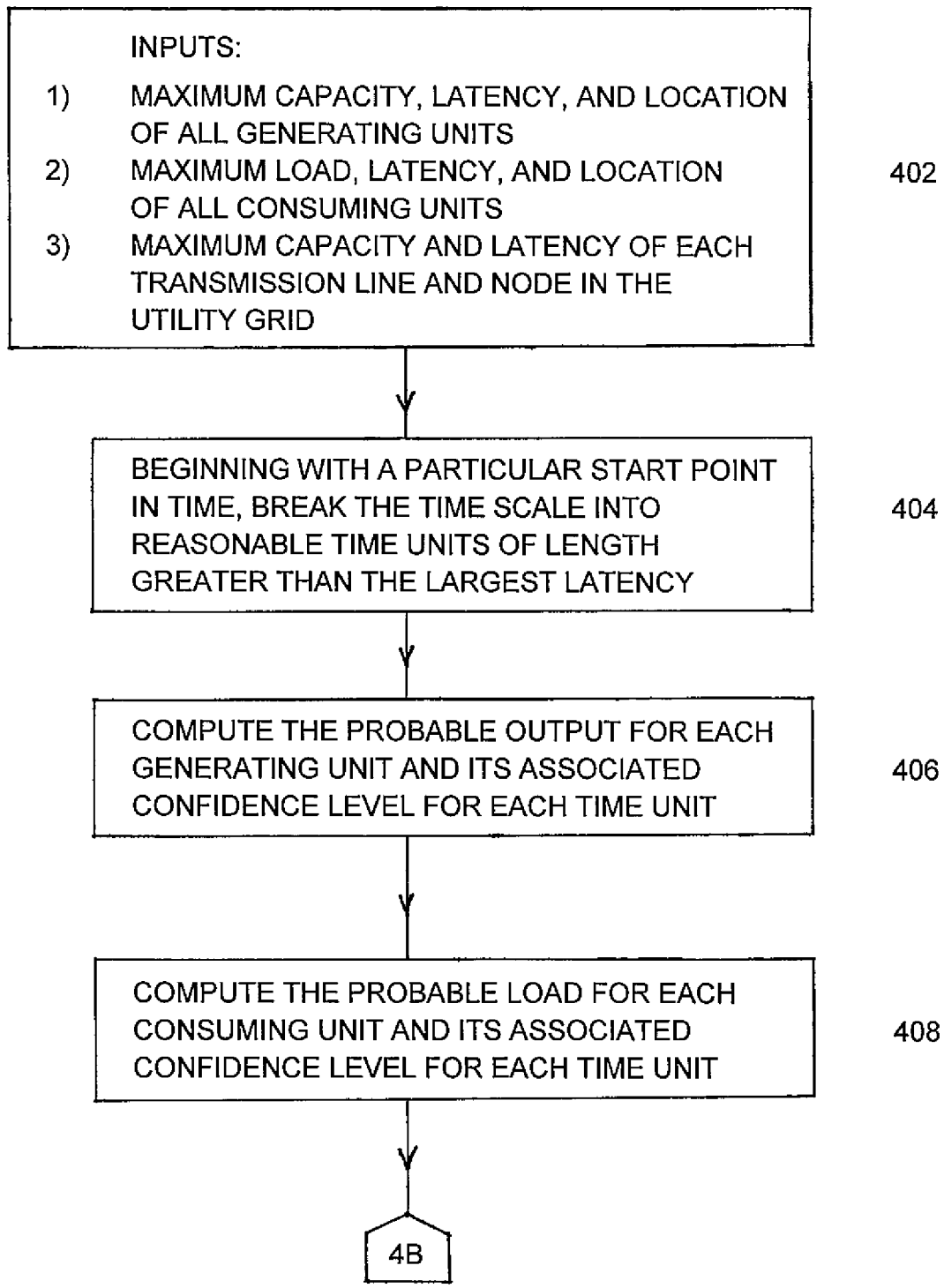
FIGS. 4A and 4B together are a flow chart illustrating a more detailed solution to the problem.
Figure 4B:
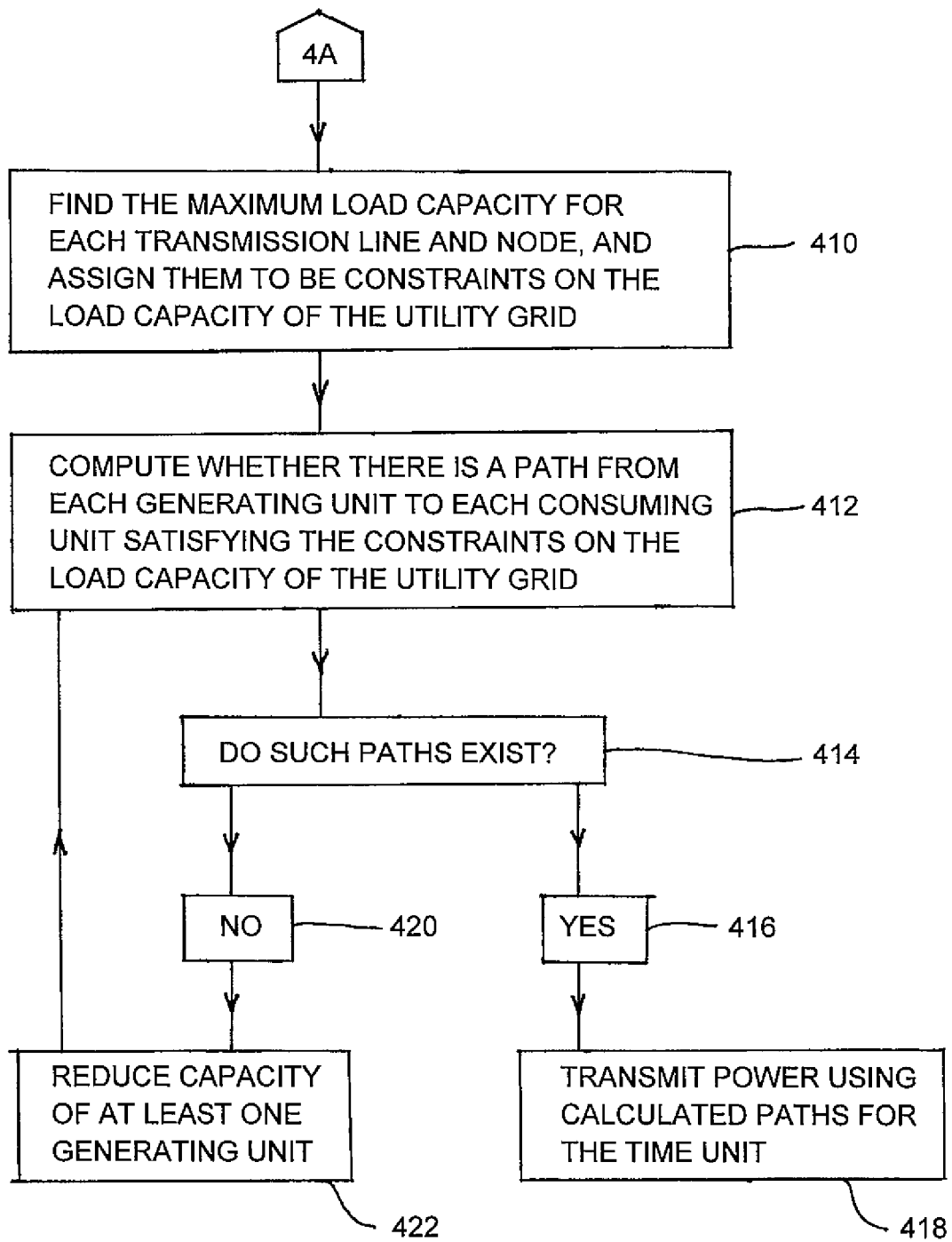

Reference is now made to FIGS. 4A and 4B, which together are a flow chart illustrating a detailed solution to the problem. The inputs required for a detailed solution to the problem, as shown in block 402, are:
1. The maximum capacity, latency, and location of all generating units, i, for i=1 to n, with n being the total number of generation units, including renewable sources such as solar and wind;
2. The maximum load requirement, latency, and location of all consuming units, j, for j=1 to m, with m being the total number of consuming units; and
3. The maximum capacity and latency of each transmission line and node of the entire utility grid in every path connecting each generation unit to each consuming unit.

The solution is again made with reference to a particular starting point in time (t=0). The next step, then, as indicated in block 404, is to break the time scale going forward from that starting point into the future into reasonable-length time units, k, for k=1 to q, with q being the number of time units into the future the solution will cover. The time unit is chosen to be longer than the largest of the latencies associated with the generating units, the consuming units and the transmission line and node segments of the utility grid. Normally, the latencies associated with generating and consuming units are on the order of hours (2 to 5 hours), whereas the latencies associated with transmission line and node segments are on the order of milliseconds. So, if the largest latency is 4 hours, we divide the time scale into time units on the order of something that is reasonably greater than 4 hours—such as 6 hours.

The next step, as indicated in block 406 of FIG. 4A, is to compute the probable output for each generating unit and the associated confidence level for each time unit k as $g(i,k)=\{G(i,k), g\_conf(i,k)\}$ for i=1 to n and k=1 to q, and to associate the value of $g(i,k)$ with each generating unit i for i=1 to n, for each time k=1 to q.

In a similar manner, as indicated in block 408 of FIG. 4A, the probable load for each consuming unit and the associated confidence level are computed for each time unit k as $c(j,k)=\{C(j,k), c\_conf(j,k)\}$ for j=1 to m and k=1 to q, and the value of $c(j,k)$ is associated with each consuming unit j for j=1 to m, for each time k=1 to q.

Referring to block 410 in FIG. 4B, for each segment (line or node) of the utility grid l, the next step is to find the maximum load capacity $X\_l$, for l=1 to p, with p being the total number of segments (lines or nodes), and to assign $X\_l$ to each segment l as the constraint on the load capacity for that segment.

Next, as indicated in blocks 412, 414 of FIG. 4B, for each time unit k=1 to q, it is necessary to compute, using a greedy algorithm, such as Kruskal, Dijkstra or Single Source Shortest Path, whether there is a path from each generating unit, i, for i=1 to n, to each consuming unit, j, for j=1 to m, following the segments k, for k=1 to p, that satisfies the following constraints:
1. $g'(i,k) \le G(i,k)+g\_conf(i,k)$ for i=1 to n, where $g'(i,k)$ is the actual generation at generating unit i at time k;
2. $c'(j,k) \le C(j,k)-c\_conf(j,k)$ for j=1 to m, where $c'(j,k)$ is the actual consumption at consuming unit j at time k; and
3. for each segment l, $x'\_l \le X\_l$ for l=1 to p.

It should be noted that in this detailed solution, the actual generation at generating unit i must be less than or equal to the probable output thereof plus the confidence level thereof, and the actual consumption at consuming unit j must be less than or equal to the probable load thereof minus the confidence level thereof. Essentially, this is a conservative approach made to ensure that the solution is a safe one for the electric utility grid.

If such paths from each generating unit, i, to each consuming unit, j, are found (block 416), it is then only necessary to set the grid structure to those paths for that time unit k to transmit power (block 418). Otherwise (block 420), it will be necessary (block 422) to reduce the capacity of at least one of the generating units, i, and repeat the computations again as many times as is necessary to find whether there is a path that satisfies the constraints above.

Figure 5:
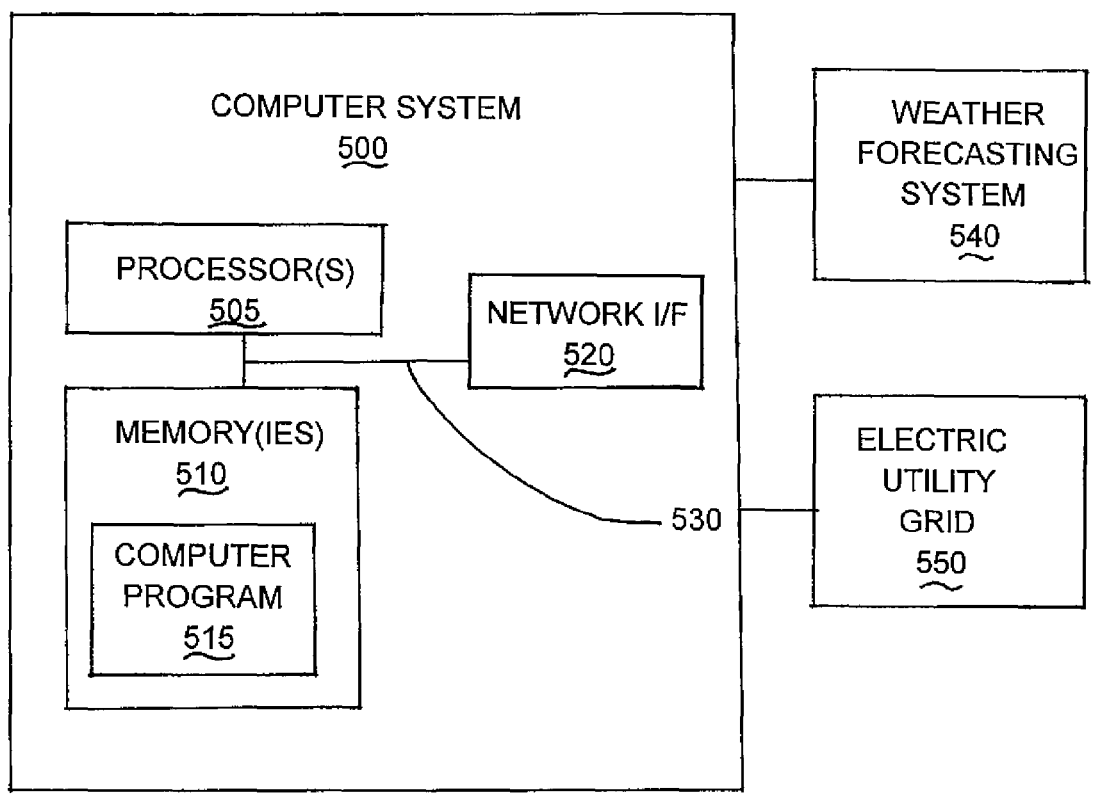
FIG. 5 shows an exemplary system for practicing the present invention.

FIG. 5 shows an exemplary system for practicing the present invention. The system includes a computer system 500 having one or more processors 505, one or more memories 510, and one or more network interfaces 520, interconnected using one or more buses 330. The one or more memories 510 include a computer program 515 defined to cause the computer system to perform one or more of the operations described herein. Weather information is obtained from a weather forecasting system 540 and is input into the computer system 500. In turn, the computer system performs the calculations necessary to set the structure of the electric utility grid 550 to the paths determined for transmitting power safely from all generating units to all consuming units.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk, a random access memory (RAM), a readonly memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, and so forth, or any suitable combination of the foregoing.

Computer program code for carrying out operations for aspects of the present invention may be written in any combination of one or more programming languages, including an object-oriented programming language, such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example, through the Internet using an Internet Service Provider.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable-medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any and all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various modifications and adaptations may become apparent to those skilled in the relevant arts in view of the foregoing description, when read in conjunction with the accompanying drawings. However, any and all modifications of the teachings of this disclosure will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the claims to follow.

What is claimed is:

1. A method for a utility grid having a network of interconnecting segments of power lines connecting generating units to consuming units, each of said interconnecting segments-having a maximum electric power capacity, said method comprising:

computing a probable electric power output for each of a plurality of generating units, each of said plurality of generating units having a maximum electric power generating capacity, said plurality of generating units including at least one generating unit whose electric power output depends on the weather, and a respective confidence level associated with each of said plurality of generating units, for a given time interval;

computing a probable electrical power load for each of a plurality of consuming units, each of said plurality of consuming units having a maximum allowed electric power load, and a respective confidence level associated with each of said plurality of consuming units, for said time interval; and determining whether there are paths having one or more segments of power lines from each of said generating units to each of said consuming units, said paths satisfying the following constraints:
 a) the actual output of each of said generating units is less than or equal to the probable output thereof for said time interval;
 b) the actual load of each of said consuming units is less than or equal to the probable load thereof for said time interval; and
 c) the actual load capacity for each of said segments is less than or equal to the maximum load capacity thereof for said time interval; and when there are paths satisfying said constraints:
 setting the utility grid to said paths; and
 transmitting electric power over said paths for said time interval.

2. The method as claimed in claim 1, further comprising, when there is no path between one of said generating units and one of said consuming units satisfying said constraints:
 reducing the maximum capacity of at least one of said generating units; and
 re-computing whether there are paths from each of said generating units to each of said consuming units as many times as is necessary to find paths satisfying said constraints, each time reducing the capacity of at least one of said generating units.

3. The method as claimed in claim 1, wherein a length of said given time interval is between five and ten hours.

4. The method as claimed in claim 1, wherein said maximum capacities of all generating units, said maximum load requirements of all consuming units, and said maximum capacities of all segments all have latencies, said latencies being time periods over which predictions relating thereto by stochastic forecasting may be made, and wherein a length of said given time interval is longer than the longest of said latencies.

5. The method as claimed in claim 1, wherein the probable output for each generating unit whose electric power output depends on the weather is determined using a stochastic model based on weather prediction.

6. The method as claimed in claim 5, wherein the stochastic model uses historical data to determine the amount of power that will be generated along with a confidence level for said time interval.

7. The method as claimed in claim 1, wherein the probable load for each of said consuming units is determined using a stochastic model based on weather prediction.

8. The method as claimed in claim 7, wherein the stochastic model uses historical data and current input, including cost of power, time of day, season, and day of the week, to determine the probable load along with a confidence level for said time interval.

9. The method as claimed in claim 1, wherein the maximum load capacity of each segment in said utility grid for said time interval is a rated capacity modified based on the physical condition of the segment as well as on weather conditions for said time interval.

10. The method as claimed in claim 1, wherein said paths from each of said generating units to each of said consuming units are computed using a greedy algorithm.

11. The method as claimed in claim 1, wherein said constraints for the actual output of each of said generating units and for the actual load of each of said consuming units are modified as follows:
 a) the actual output of each of said generating units is less than or equal to the probable output thereof plus the confidence level thereof for said time interval;
 b) the actual load of each of said consuming units is less than or equal to the probable load thereof minus the confidence level thereof for said time interval.

12. An apparatus comprising:
one or more processors; and
one or more memories including computer program code, the one or more memories and the computer program code configured, with the one or more processors, to cause the apparatus to perform the following for a utility grid having a network of interconnecting segments of power lines connecting generating units to consuming units, each of said interconnecting segments-having a maximum electric power capacity:

computing a probable electric power output for each of a plurality of generating units, each of said plurality of generating units having a maximum electric power generating capacity, said plurality of generating units including at least one generating unit whose electric power output depends on the weather, and a respective confidence level associated with each of said plurality of generating units, for a given time interval;

computing a probable electrical power load for each of a plurality of consuming units, each of said plurality of consuming units having a maximum allowed electric power load, and a respective confidence level associated with each of said plurality of consuming units, for said time interval; and determining whether there are paths having one or more segments of power lines from each of said generating units to each of said consuming units, said paths satisfying the following constraints:
 a) the actual output of each of said generating units is less than or equal to the probable output thereof for said time interval;
 b) the actual load of each of said consuming units is less than or equal to the probable load thereof for said time interval; and
 c) the actual load capacity for each of said segments is less than or equal to the maximum load capacity thereof for said time interval; and when there are paths satisfying said constraints:
  setting the utility grid to said paths; and
  transmitting electric power over said paths for said time interval.

13. The apparatus as claimed in claim 12, wherein said one or more memories and the computer program code are further configured, with the one or more processors, to cause the apparatus to perform, when there is no path between one of said generating units and one of said consuming units satisfying said constraints:
  reducing the maximum capacity of at least one of said generating units; and
  re-computing whether there are paths from each of said generating units to each of said consuming units as many times as is necessary to find paths satisfying said constraints, each time reducing the capacity of at least one of said generating units.

14. The apparatus as claimed in claim 12, wherein a length of said given time interval is between five and ten hours.

15. The apparatus as claimed in claim 12, wherein said maximum capacities of all generating units, said maximum load requirements of all consuming units, and said maximum capacities of all segments all have latencies, said latencies being time periods over which predictions relating thereto by stochastic forecasting may be made, and wherein a length of said given time interval is longer than the longest of said latencies.

16. The apparatus as claimed in claim 12, wherein the probable output for each generating unit whose electric power output depends on the weather is determined using a stochastic model based on weather prediction.

17. The apparatus as claimed in claim 16, wherein the stochastic model uses historical data to determine the amount of power that will be generated along with a confidence level for said time interval.

18. The apparatus as claimed in claim 12, wherein the probable load for each of said consuming units is determined using a stochastic model based on weather prediction.

19. The apparatus as claimed in claim 18, wherein the stochastic model uses historical data and current input, including cost of power, time of day, season, and day of the week, to determine the probable load along with a confidence level for said time interval.

20. The apparatus as claimed in claim 12, wherein the maximum load capacity of each segment in said utility grid for said time interval is a rated capacity modified based on the physical condition of the segment as well as on weather conditions for said time interval.

21. The apparatus as claimed in claim 12, wherein said paths from each of said generating units to each of said consuming units are computed using a greedy algorithm.

22. The apparatus as claimed in claim 12, wherein said constraints for the actual output of each of said generating units and for the actual load of each of said consuming units are modified as follows:
  a) the actual output of each of said generating units is less than or equal to the probable output thereof plus the confidence level thereof for said time interval;
  b) the actual load of each of said consuming units is less than or equal to the probable load thereof minus the confidence level thereof for said time interval.

23. A computer program product comprising a computer-readable storage medium bearing computer program code embodied therein for use with a computer, the computer program code comprising code for performing at least the following for a utility grid having a network of interconnecting segments of power lines connecting generating units to consuming units, each of said interconnecting segments-having a maximum electric power capacity:
  computing a probable electric power output for each of a plurality of generating units, each of said plurality of generating units having a maximum electric power generating capacity, said plurality of generating units including at least one generating unit whose electric power output depends on the weather, and a respective confidence level associated with each of said plurality of generating units, for a given time interval;
  computing a probable electrical power load for each of a plurality of consuming units, each of said plurality of consuming units having a maximum allowed electric power load, and a respective confidence level associated with each of said plurality of consuming units, for said time interval; and
  determining whether there are paths having one or more segments of power lines from each of said generating units to each of said consuming units, said paths satisfying the following constraints:
    a) the actual output of each of said generating units is less than or equal to the probable output thereof for said time interval;
    b) the actual load of each of said consuming units is less than or equal to the probable load thereof for said time interval; and
    c) the actual load capacity for each of said segments is less than or equal to the maximum load capacity thereof for said time interval; and
  when there are paths satisfying said constraints:
    setting the utility grid to said paths; and
    transmitting electric power over said paths for said time interval.

24. The computer program product as claimed in claim 23, wherein the computer program code further comprises code for performing, when there is no path between one of said generating units and one of said consuming units satisfying said constraints:
  reducing the maximum capacity of at least one of said generating units; and
  re-computing whether there are paths from each of said generating units to each of said consuming units as many times as is necessary to find paths satisfying said constraints, each time reducing the capacity of at least one of said generating units.

25. The computer program product as claimed in claim 23, wherein a length of said given time interval is between five and ten hours.

26. The computer program product as claimed in claim 23, wherein said maximum capacities of all generating units, said maximum load requirements of all consuming units, and said maximum capacities of all segments all have latencies, said latencies being time periods over which predictions relating thereto by stochastic forecasting may be made, and wherein a length of said given time interval is longer than the longest of said latencies.

27. The computer program product as claimed in claim 23, wherein the probable output for each generating unit whose electric power output depends on the weather is determined using a stochastic model based on weather prediction.

28. The computer program product as claimed in claim 27, wherein the stochastic model uses historical data to determine the amount of power that will be generated along with a confidence level for said time interval.

29. The computer program product as claimed in claim 23, wherein the probable load for each of said consuming units is determined using a stochastic model based on weather prediction.

30. The computer program product as claimed in claim 29, wherein the stochastic model uses historical data and current input, including cost of power, time of day, season, and day of the week, to determine the probable load along with a confidence level for said time interval.

31. The computer program product as claimed in claim 23, wherein the maximum load capacity of each segment in said utility grid for said time interval is a rated capacity modified based on the physical condition of the segment as well as on weather conditions for said time interval.

32. The computer program product as claimed in claim 23, wherein said paths from each of said generating units to each of said consuming units are computed using a greedy algorithm.

33. The computer program product as claimed in claim 23, wherein said constraints for the actual output of each of said generating units and for the actual load of each of said consuming units are modified as follows:
   a) the actual output of each of said generating units is less than or equal to the probable output thereof plus the confidence level thereof for said time interval;
   b) the actual load of each of said consuming units is less than or equal to the probable load thereof minus the confidence level thereof for said time interval.

* * * * *